No. 780,928. PATENTED JAN. 24, 1905.
W. T. YARD.
SPRAYING MECHANISM.
APPLICATION FILED JULY 30, 1904.
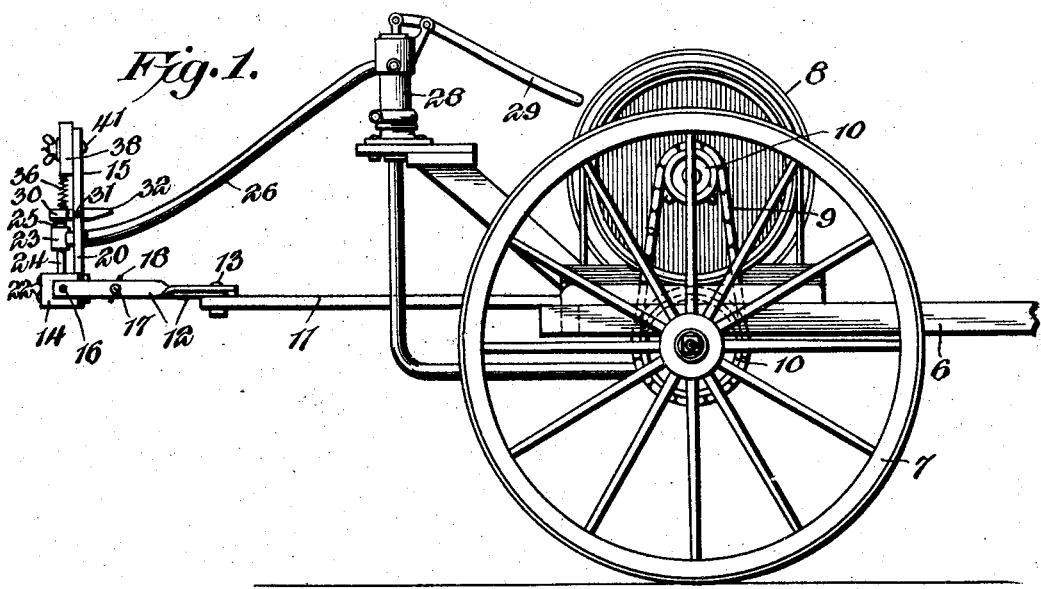
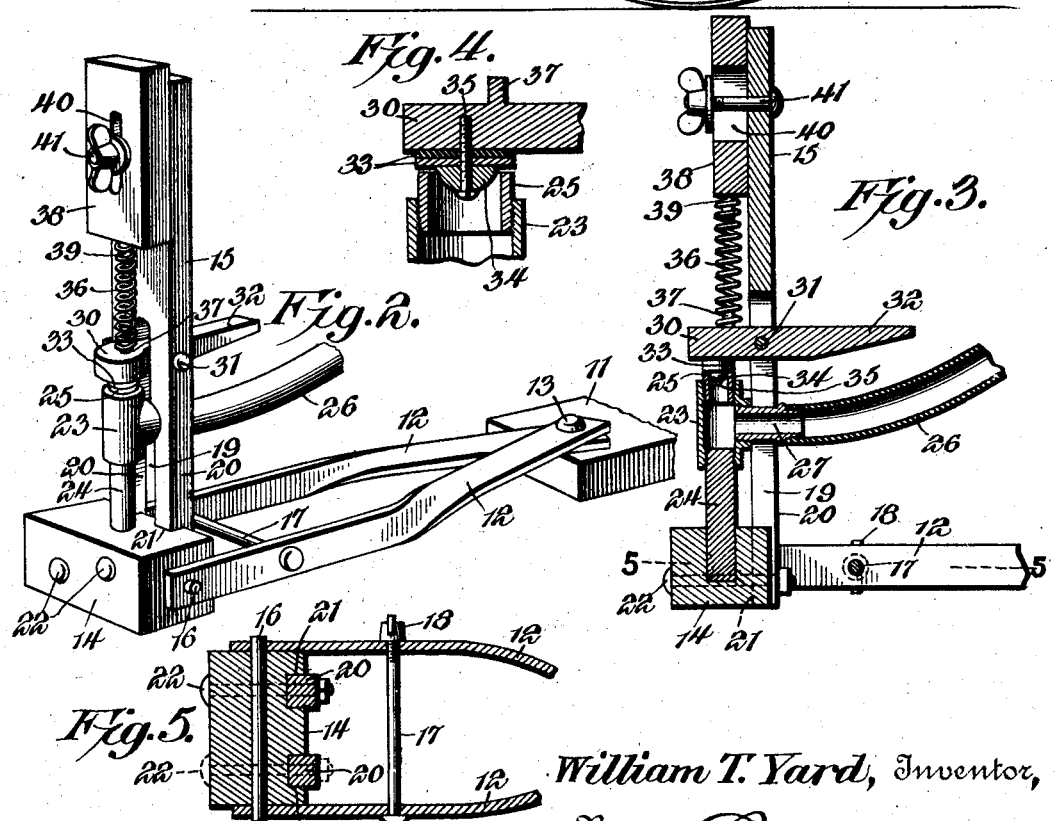
William T. Yard, Inventor,
Witnesses No. 780,928. Patented January 24, 1905.

UNITED STATES PATENT OFFICE.

WILLIAM T. YARD, OF TRENTON, NEW JERSEY.

SPRAYING MECHANISM.

SPECIFICATION forming part of Letters Patent No. 780,928, dated January 24, 1905.

Application filed July 30, 1904. Serial No. 218,866.

*To all whom it may concern:*

Be it known that I, WILLIAM T. YARD, a citizen of the United States, residing at Trenton, in the county of Mercer and State of New Jersey, have invented a new and useful Spraying Mechanism, of which the following is a specification.

This invention relates to means that is particularly intended for spraying insecticides, though perhaps useful for other analogous purposes.

The object to be secured by this invention is the provision of novel means of a simple nature for economically and thoroughly distributing material over a comparatively great area, said means being such that the spray can be more or less comminuted as desired and the direction thereof varied in order to properly operate upon the different varieties of vegetation.

The preferred embodiment of the invention is illustrated in the accompanying drawings, wherein—

Figure 1 is a side elevation of the machine. Fig. 2 is a detail perspective view of the nozzle and supporting means therefor. Fig. 3 is a vertical sectional view therethrough. Fig. 4 is a detail vertical sectional view, on an enlarged scale, through the upper portion of the nozzle and controlling-valve; and Fig. 5 is a sectional view taken on the line 5 5 of Fig. 3.

Similar reference-numerals indicate corresponding parts in all the figures of the drawings.

In the embodiment illustrated a suitable vehicle 6 is employed, in the present instance supported by wheels 7. A storage tank or reservoir 8 is suitably mounted on the vehicle and contains the usual agitating means operated by an endless sprocket-chain 9, passing about wheels 10, attached, respectively, to the wheel 7 and said agitating mechanism.

The vehicle is provided with a rearwardly-extending bar 11, and upon the rear end thereof are pivotally-supported arms 12, the bolt 13, which connects said arms to the bar 11, also serving as a pivotal connection for the arms. The said arms are twisted between their ends, and their rear ends are spaced apart to receive therebetween a supporting device in the form of a block 14, carrying an upwardly-extending standard 15. The block 14 is provided at its ends with projecting gudgeons 16, journaled in the rear ends of the arms 12, upon which, therefore, said block has a pivotal movement. The arms are connected by a clamping-bolt 17, having a thumb-nut 18. This clamping-bolt and nut afford means for drawing the arms together, thereby clamping the supporting-block between them and holding the same against its pivotal movement. The standard 15 has its lower end bifurcated, as shown at 19, and the spaced legs 20, formed thereby, have their lower ends seated in recesses 21, formed in the front side of the block, where said legs are held by suitable bolts 22.

The spraying-nozzle consists of a body 23, that is substantially in the form of a T-coupling, having a depending stem 24 mounted in the block 14. The upper end of the nozzle is provided with a collar 25, the bore through the upper end of which constitutes the discharge-outlet. A supply-pipe 26, connected to a nipple 27, that extends from the nozzle through the bifurcation of the standard, is also connected to the storage reservoir or tank, and located in this pipe is a suitable force-pump 28, which in the present instance is shown as having a handle 29, by means of which it is manually operated, though any desired or well-known type of power-pump may be employed.

The discharge-outlet of the nozzle, and consequently the outflow of liquid therefrom, is controlled by means of a valve, comprising a lever 30, pivoted between its ends, as shown at 31, in the bifurcation of the standard 15, one end of the lever extending on one side of the standard and constituting a trip, as shown at 32, the other end carrying leather and rubber washers 33, the lower of which is adapted to rest snugly upon the upper end of the collar 25, and thereby close the discharge-outlet. The convexed spraying-head 34 is also carried by this end of the lever, said head and washers 33 being attached thereto, preferably by means of a single clamping device, as a screw 35. In order to urge the valve 7 into closed position against the pressure of the liquid, a coiled spring 36 is employed, the lower end of which bears upon the lever 30 directly above the nozzle, said lever having a retaining-leg 37 received within the lower end of the spring. The upper end of said spring is borne upon by a tension-varying block 38, having at its lower end a depending retaining projection 39 received within the upper end of the spring. The block 28 is vertically slidable upon the standard and has a longitudinally-disposed slot 40, through which passes a clamping-bolt 41, secured to the standard and serving to hold the block against movement.

The operation of the machine will, it is thought, be clear to any one skilled in the art. As the vehicle is moved over the vegetation to be sprayed the pump is operated, and thus the insecticide drawn from the storage tank or reservoir is forced through the nozzle and projected over such vegetation. It will be observed that in this structure, which as a whole is very simple, the support can be adjusted, so that the nozzle may be tilted to any inclination desired. This is accomplished by loosening the clamping-bolt 17, swinging the standard and supporting-block to the desired position, and afterward retightening the said bolt. Moreover, the fineness of the spray may be readily varied by placing greater or less tension upon the spring 36, the greater the tension the more power being needed to open the valve, and consequently the finer the spray. Moreover, this valve besides requiring the desired pressure for spraying purposes serves, because of the spring-head, to spread the liquid as the same passes through the nozzle.

From the foregoing it is thought that the construction, operation, and many advantages of the herein-described invention will be apparent to those skilled in the art without further description, and it will be understood that various changes in the size, shape, proportion, and minor details of construction may be resorted to without departing from the spirit or sacrificing any of the advantages of the invention.

Having thus described my invention, what I claim as new, and desire to secure by Letters Patent, is—

1. In a sprayer of the character described, the combination with a supporting device including a standard, of a nozzle mounted on the supporting device at one side of the standard, a valve movably mounted on an intermediate portion of the standard and normally closing the nozzle, and means movably supported on the standard and bearing against the side of the valve opposite the nozzle for yieldingly holding the valve in closed condition.

2. In a sprayer of the character described, the combination with a supporting device including a standard, of a nozzle mounted on the supporting device at one side of the standard, a valve pivotally mounted on an intermediate portion of the standard and normally closing the nozzle, a spring bearing against the side of the valve opposite the nozzle for yieldingly holding said valve in closed condition, and a device slidably mounted on one side of the upper free end of the standard and bearing against the spring to vary its tension.

3. In a sprayer of the character described, the combination with a support including a base-block and an upstanding bifurcated standard carried thereby, of a nozzle mounted on the base-block and having a discharge-outlet in its upper end, said nozzle being disposed at one side of the standard, a valve pivoted in the bifurcation of the standard and normally closing the outlet of the nozzle, said valve having a spraying-head, a coiled spring located at one side of the standard and bearing downwardly upon the valve, a tension-varying block slidably mounted on the standard and bearing against the spring, and a holding-bolt adjustably connecting the block and standard.

4. In a sprayer of the character described, the combination with a vehicle, of spaced arms carried thereby and adjustable toward and from each other, a supporting device located between and adjustable with respect to the arms, means for clamping the arms upon the supporting device to hold the same against movement, a reservoir mounted on the vehicle, a nozzle carried by the supporting device and adjustable therewith, and a supply-conduit connecting the reservoir and nozzle.

5. In a sprayer of the character described, the combination with a vehicle, of spaced arms carried thereby and adjustable toward and from each other, a supporting device located between the arms, a pivot connecting the arms and supporting device, means for clamping the arms upon the supporting device to hold the same against movement on the pivot, a reservoir mounted on the vehicle, a nozzle carried by the supporting device and adjustable therewith, and a supply-conduit connecting the reservoir and nozzle.

6. In a sprayer of the character described, the combination with arms, of a support for the arms, a pivot connecting the arms at one end and securing the same to the support, a supporting device located between the other ends of the arms, a pivotal connection between the arms and device, a nozzle carried by the support, and a bolt connecting the arms for drawing the same toward each other and thereby clamping the supporting device between them against pivotal movement.

7. In a sprayer of the character described, the combination with pivotally-associated arms, of means for supporting the arms, a supporting-block located therebetween, pivotal connections between the block and arms, a connection between the arms for clamping the block against pivotal movement, a standard mounted on the block, a nozzle carried by the block, and means for varying the outflow through the nozzle, said means being carried by the standard.

8. In a sprayer of the character described, the combination with a vehicle, of a storage-tank mounted thereon, a rearwardly-extending bar secured to the vehicle, arms pivotally connected to the bar, a support located between the arms, a pivotal connection between the support and arms, means for clamping the arms upon the support to hold the latter against its pivotal movement, a nozzle carried by the support and having an outlet, a valve for controlling the outlet, a variable spring bearing against the valve, and a pipe connecting the storage-tank and the nozzle.

In testimony that I claim the foregoing as my own I have hereto affixed my signature in the presence of two witnesses.

WILLIAM T. YARD.

Witnesses:
   ALVIN W. SYKES,
   EMMA S. SYKES.